(12) United States Patent
Weinmann et al.

(10) Patent No.: US 8,248,017 B2
(45) Date of Patent: Aug. 21, 2012

(54) METHOD FOR OPERATING AN ELECTRIC MOTOR AND APPARATUS FOR PERFORMING THE METHOD

(75) Inventors: Martin Weinmann, Bad Waldsee (DE); Stefan Zeh, Wangen (DE); Rainer Frisch, Wangen (DE); Hartmut Wauer, Kisslegg (DE); Nicola-Valeriu Olarescu, Wangen (DE); Radu Liviu Florea, Nürnberg (DE); Martin Rieser, Wangen (DE)

(73) Assignee: Diehl AKO Stiftung & Co. KG, Wangen (DE)

( * ) Notice: Subject to any disclaimer, the term of this patent is extended or adjusted under 35 U.S.C. 154(b) by 337 days.

(21) Appl. No.: 12/614,542

(22) Filed: Nov. 9, 2009

(65) Prior Publication Data

US 2010/0117583 A1 May 13, 2010

(30) Foreign Application Priority Data

Nov. 7, 2008 (DE) .......................... 10 2008 056 321
Feb. 26, 2009 (DE) .......................... 10 2009 010 408

(51) Int. Cl.
*G01R 31/02* (2006.01)
(52) U.S. Cl. ............... 318/490; 318/400.11; 318/400.21

(58) Field of Classification Search .................. 318/490, 318/400.21, 400.11, 803, 801, 376, 380, 318/759, 629, 602, 270, 443; 363/157
See application file for complete search history.

(56) References Cited

U.S. PATENT DOCUMENTS

2002/0008483 A1   1/2002  Kaeufl et al.
2004/0085087 A1*  5/2004  Zehentner et al. ............ 324/772

FOREIGN PATENT DOCUMENTS

| AT | 390699 B | 6/1990 |
| DE | 19650403 A1 | 6/1998 |
| DE | 19855996 C1 | 12/1999 |

* cited by examiner

*Primary Examiner* — Karen Masih
(74) *Attorney, Agent, or Firm* — Laurence A. Greenberg; Werner H. Stemer; Ralph E. Locher

(57) ABSTRACT

A method for operating an electric motor with at least two motor terminals that are driven by a control device contains the steps of short-circuiting of at least two of the motor terminals of the electric motor by the control device; measurement of the motor phase currents at the short-circuited motor terminals; and identification of a standstill of the electric motor if a magnitude and/or a frequency of the motor phase currents measured lies below a predefined limit value. In the case of such a reliable identification of the standstill of the electric motor, an enable signal can then advantageously be generated in order, by way of example, to enable access to an apparatus driven by the electric motor.

13 Claims, 2 Drawing Sheets

METHOD FOR OPERATING AN ELECTRIC MOTOR AND APPARATUS FOR PERFORMING THE METHOD

CROSS-REFERENCE TO RELATED APPLICATION

This application claims the priority, under 35 U.S.C. §119, of German applications DE 10 2008 056 321.8, filed Nov. 7, 2008 and DE 10 2009 010 408.9, filed Feb. 26, 2009, the prior applications are herewith incorporated by reference in their entireties.

BACKGROUND OF THE INVENTION

Field of the Invention

The present invention relates to a method for operating an electric motor which identifies a standstill of the electric motor.

On account of the mass of the rotating parts of an electric motor and of the device driven by the latter, an electric motor in principle still runs on for a certain time after switch-off. This property is undesirable for various applications. Therefore, electric motors are often configured with a braking mechanism.

In addition to the provision of a mechanical brake, it is also known to brake electric motors after switch-off by short-circuit braking. After discontinuation of the operating voltage, the electric motor undergoes transition to the generator operating mode upon further rotation. If the motor terminals of the electric motor are short-circuited, then the mechanical rotational energy that has remained after switch-off is consumed by the short-circuit power and the electric motor comes to a standstill within a short time.

In many appliances operated by electric motor, in particular including in the domestic sector, such as, for example, in the case of laundry treatment appliances, centrifuges, food processors and the like, for reasons of energy efficiency and saving weight and raw materials, electronically commutated motors that are excited by a permanent magnet are increasingly being used. Through the use of powerful controllers, these drives are increasingly being regulated without sensors.

For safety reasons, however, a rotational speed sensor is still used even in these cases, for reliable identification of the standstill. Such rotational speed sensors mean high additional costs, however, particularly as a result of their mounting and wiring outlay. Furthermore, these sensors are often sensitive and the cause of appliance failures. The disadvantages mentioned are of significance particularly in the case of mass-produced articles, which include the domestic appliances mentioned above.

SUMMARY OF THE INVENTION

It is accordingly an object of the invention to provide a method for operating an electric motor and an apparatus for performing the method which overcome the above-mentioned disadvantages of the prior art methods and devices of this general type, in which a reliable identification of the standstill is obtained without the use of rotational speed sensors.

The method according to the invention for operating an electric motor with at least two motor terminals that are driven by a control device contains the following steps:

a) short-circuiting of at least two of the motor terminals of the electric motor by the control device;
b) measurement of the motor phase currents at the short-circuited motor terminals; and
c) identification of a standstill of the electric motor if a magnitude and/or a frequency of the motor phase currents measured in step b) lies below a predefined limit value.

The method first uses the short-circuit braking of the electric motor as described above, in the case of which at least two of the motor terminals of the electric motor are short-circuited, in order to shorten the time for the electric motor to attain its standstill after switch-off. In order to ensure that the electric motor is at a standstill or its rotational speed lies below a critical limit value, the motor phase currents are then measured at the short-circuited motor terminals and a standstill of the electric motor is identified only when a magnitude and/or a frequency of the motor phase currents thus measured lies below a predefined limit value. The motor phase currents measured at the short-circuited motor terminals are a measure of the currents induced in the leads by the electric motor in the generator operating mode, and thus a measure of the still existing rotational speed of the electric motor.

The method does not require special and cost-intensive rotational speed sensors, but rather only a suitable current measuring device, which in many cases are already present in the control device. This method thus permits a reliable identification of the standstill of the electric motor without additional components such as rotational speed sensors, for example.

With the method proposed, it is advantageously possible to operate electric motors that drive appliances which are permitted to be accessible for a user only when their rotational speed lies below a critical limit value. A laundry treatment appliance (washing machine, dryer, washer-dryer) with a laundry drum driven by an electric motor shall be mentioned as an illustrative example in this connection.

The electric motor can be either a DC motor or an AC motor. The solution proposed here can be used in principle for all types of AC motors that use magnetic excitation, i.e. for example in electronically commutated DC motors, stepper motors and synchronous motors that each use a permanent magnet, or in the case of reluctance motors and stepper motors that use magnetization of an iron rotor. Moreover, the electric motor is not restricted to a specific number of motor phases, even though an exemplary embodiment with a three-phase electric motor is explained in greater detail below.

The "short-circuiting" of motor terminals of the electric motor is understood to mean a circuit state in which a difference voltage between the respective motor terminals is zero or is controlled at least to a smallest possible voltage, that is to say lies below a predefined voltage limit value. The absolute voltage potential of the motor terminals with respect to a pole of the control device need not necessarily be temporally constant in this case. It is merely necessary to ensure that the relevant difference voltage at every point in time lies below the predefined voltage limit value.

The "standstill" of the electric motor means that the rotational speed of the electric motor is zero or as small as possible, that is to say lies below a predefined critical limit value.

In one preferred embodiment of the invention, it is also possible for all the motor terminals of the electric motor to be short-circuited by the control device.

In method step c) what can be used as the magnitude of the motor phase currents is, by way of example, the root-mean-square value thereof or the average value thereof within a measurement window.

In order to improve the reliability of the identification of the standstill it can be advantageous, moreover, if the measurement of the motor phase currents in method step b) is carried out during a measurement window that is at least as long as a period duration of a highest still uncritical rotational speed of the motor.

In a further configuration of the invention, the identification of the standstill of the electric motor in step c) can be effected only if the sum of all the motor phase currents measured in step b) is substantially equal to zero. By virtue of this check of whether the sum of all the measured motor phase currents is substantially equal to zero, the functionality of the current measurement itself is checked. If the sum is not substantially equal to zero, then at least one current measurement or the corresponding current measuring device is defective. In this case, by way of example, a corresponding fault signal can be output and/or further steps that can be permitted only when the electric motor is at a standstill can be prevented.

In one configuration of the invention, the control device of the electric motor can have a frequency converter with a voltage intermediate circuit, and the motor phase currents can be measured in a bridge branch of the voltage intermediate circuit. During the measurement of the motor phase currents in method step b), the motor terminals can then be clamped for example to a pole (negative pole or positive pole) of the voltage intermediate circuit.

Preferably, the motor terminals, during the measurement of the motor phase currents in method step b), can be clamped to the pole of the voltage intermediate circuit which is connected to the bridge branch of the voltage intermediate circuit in which the motor phase currents are measured.

In order to improve the accuracy of the identification of the standstill, the current measuring device used for measuring the motor phase currents can be adjusted. In order to be able to detect even very small currents, it is advantageous to adjust the current measuring device at zero current. For this purpose, it is proposed that the motor terminals, for adjusting the current measuring device, are clamped to the pole of the voltage intermediate circuit which is connected to the bridge branch of the voltage intermediate circuit in which the motor phase currents are not measured.

In yet another configuration of the invention, the frequency of the motor phase currents that is used for the identification of the standstill can be determined in method step c) in one or in a plurality of motor phases or from a temporal separation of at least two current measurement points between at least two motor phases. A faster evaluation of the current frequency is generally effected by the evaluation of a plurality of phases.

In one advantageous application of the method according to the invention, an enable signal can furthermore be generated if a standstill of the electric motor has been identified in method step c). The enable signal is on the one hand reset in the event of a reset of the electric motor and/or its control device and on the other hand reset if the electric motor is rotated again after the standstill.

Since electronically commutated motors cannot rotate more rapidly than is predefined by the electrical rotating field frequency, it may be sufficient to carry out the identification of the standstill only after the reversion of the electric motor from a supercritical rotational speed or after a power on reset of the control device. The access enable is then maintained as long as no electrical rotating field frequencies with supercritical rotational speeds are generated. In the case of washing machines, this critical rotational speed is 60 drum revolutions per minute, for example. Since the washing rotational speeds usually lie in the range of up to 50 rpm, the access authorization has to be checked in this application for example only upon a reversion from a spin speed and after the power on reset of the controller according to the method proposed here.

Other features which are considered as characteristic for the invention are set forth in the appended claims.

Although the invention is illustrated and described herein as embodied in a method for operating an electric motor and an apparatus for performing the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
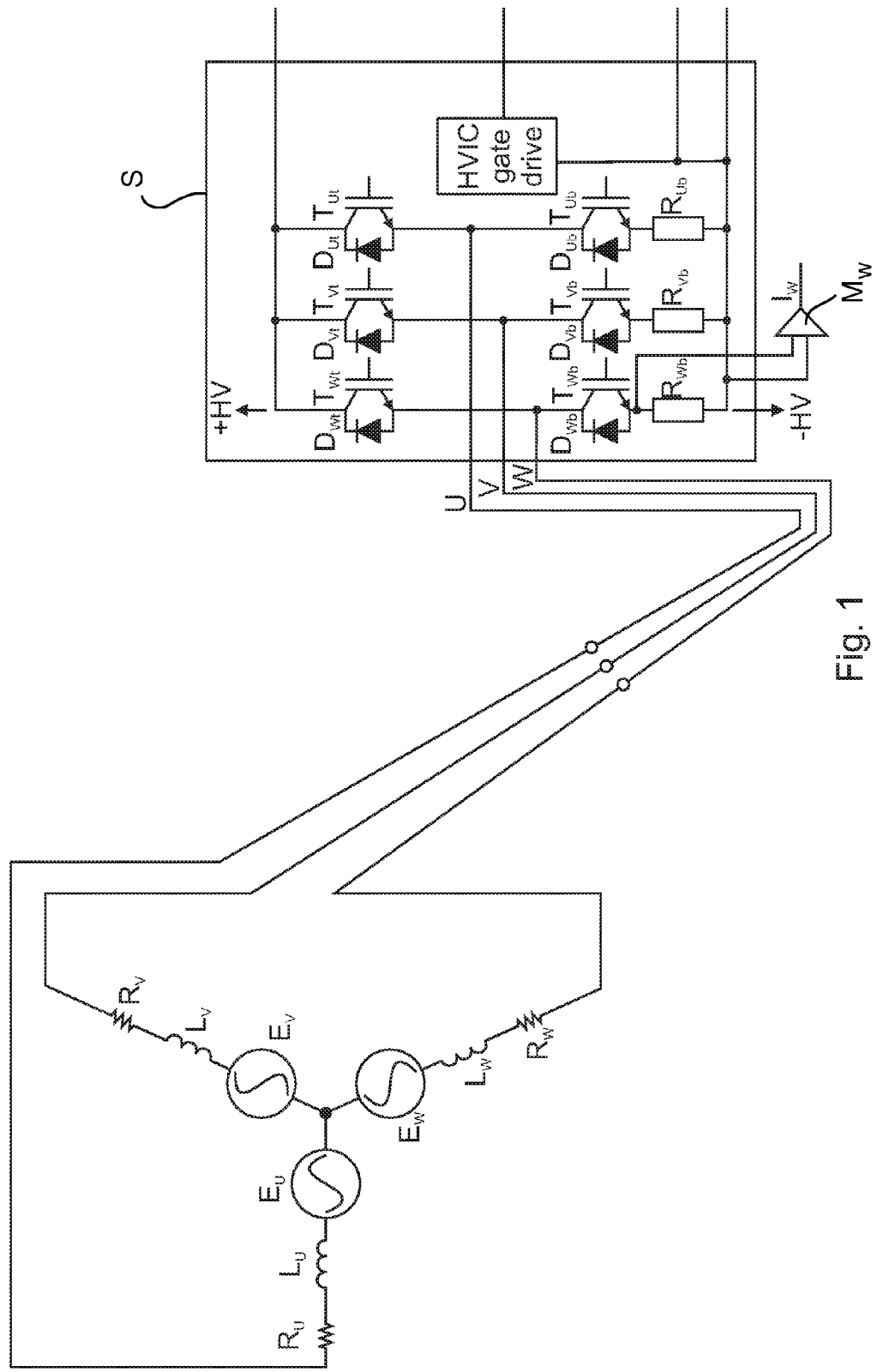
FIG. 1 is a schematic illustration of a circuit construction of an exemplary electric motor in which the method of the invention can be used.

Referring now to the figures of the drawing in detail and first, particularly, to FIG. 1 thereof, there is shown a circuit construction that concerns a three-phase electric motor excited by a permanent magnet, such as can be used for example in laundry treatment appliances (washing machines, driers, washer-driers) for driving a laundry drum. Since the user of the laundry treatment appliance is not permitted to have access to the laundry drum, for safety reasons, an identification of a standstill is used and an authorization to access the laundry drum is enabled only when a standstill of the electric motor has been identified. However, the method of the invention is not intended to be restricted only to this application.

As illustrated by way of example in FIG. 1, the electric motor has three star-connected phases U, V, W. The motor resistances $R_U$, $R_V$, $R_W$ and the motor inductances $L_U$, $L_V$, $L_W$ of the motor phases U, V and W are depicted in the equivalent circuit diagram. The voltages $E_U$, $E_V$, $E_W$ for the three motor phases U, V and W that are induced in the stator of the electric motor by the rotor (permanent magnet) are additionally indicated.

The electric motor has three motor terminals U, V, W corresponding to its three motor phases U, V and W. A control device (e.g. controller) S drives the electric motor via these three motor terminals U, V, W. The control device S has, in particular, a frequency converter with a voltage intermediate circuit. As illustrated in FIG. 1, the voltage intermediate circuit is constructed in a known manner from a half-bridge circuit having a lower half-bridge branch, which is connected to a negative pole –HV, and an upper half-bridge branch, which is connected to a positive pole +HV of the voltage intermediate circuit. However, the constructions of the control device S and of the voltage intermediate circuit are not restricted only to these embodiments.

Each of the motor terminals U, V, W is connected to the negative pole –HV of the voltage intermediate circuit via a first switch (e.g. transistor) $T_{Ub}$, $T_{Vb}$, $T_{Wb}$ of the lower half-bridge branch and to the positive pole +HV of the voltage intermediate circuit via a second switch (e.g. transistor) $T_{Ut}$, $T_{Vt}$, $T_{Wt}$ of the upper half-bridge branch. A corresponding freewheeling diode $D_{Ub}$, $D_{Vb}$, $D_{Wb}$, $D_{Ut}$, $D_{Vt}$, $D_{Wt}$ (designated generally by D hereinafter) is respectively connected in parallel with these first and second switches $T_{Ub}$, $T_{Vb}$, $T_{Wb}$, $T_{Ut}$, $T_{Vt}$, $T_{Wt}$ (generally designated by T hereinafter).

For braking the electric motor, the motor terminals U, V, W are short-circuited by the switches T of the voltage intermediate circuit. That is to say that the motor terminals U, V, W at every point in time are in each case at the same voltage potential, that is to say preferably the positive pole +HV or the negative pole −HV of the voltage intermediate circuit.

Figure 2:
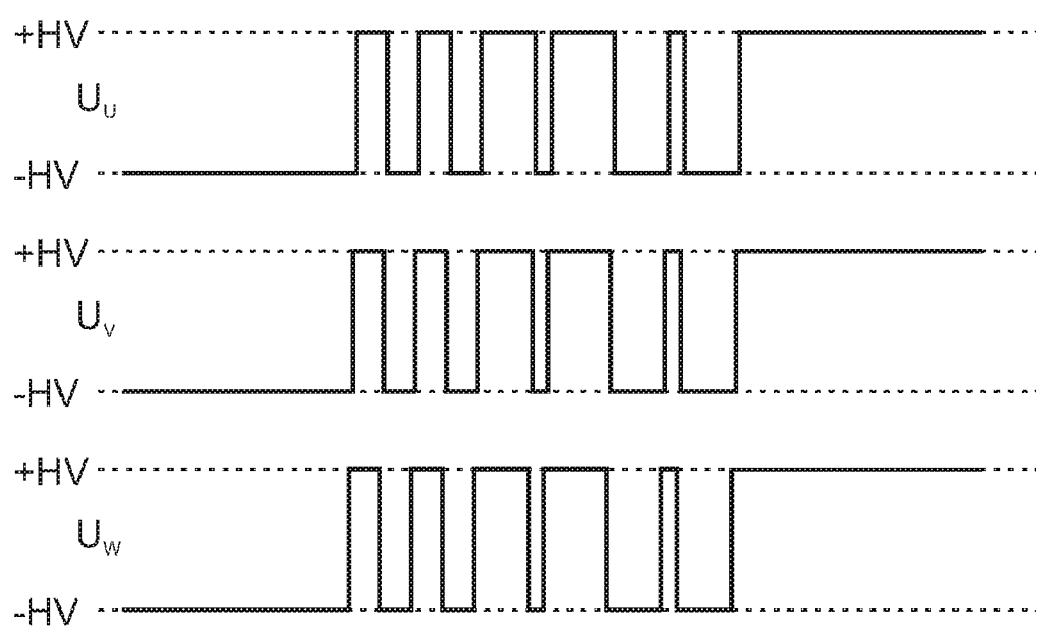
FIG. 2 is a temporal profile of the motor voltages at motor terminals during a short-circuiting of the motor terminals of the electric motor from FIG. 1.

The motor terminals U, V, W can be short-circuited by connecting all the motor terminals to the negative pole −HV or to the positive pole +HV of the voltage intermediate circuit. The absolute voltage potential of the motor terminals with respect to a pole of the voltage intermediate circuit need not necessarily be temporally constant in this case. It is merely necessary to ensure that at every point in time the difference voltage between the motor terminals U, V, W to be short-circuited is as small as possible or zero. This is illustrated by way of example in FIG. 2, in which the motor voltages $U_U$, $U_V$, $U_W$ at the motor terminals U, V, W are plotted against time.

In the lower half-bridge, each of the motor terminals U, V, W is furthermore connected to the negative pole −HV of the voltage intermediate circuit via a measuring resistor $R_{Ub}$, $R_{Vb}$, $R_{Wb}$. Via the measuring resistors $R_{Ub}$, $R_{Vb}$, $R_{Wb}$, the respective motor phase currents $I_U$, $I_V$, $I_W$ can be detected by suitable current measuring devices $M_U$, $M_V$, $M_W$. For the sake of better clarity, only the current measuring device $M_W$ for detecting the motor phase current $I_W$ at the motor terminal W is illustrated in FIG. 1.

In order to be able to reliably assess a standstill of the electric motor, after the above short-circuiting of the motor terminals U, V and W (method step a) of the invention), the motor phase currents $I_U$, $I_V$, $I_W$ are measured during a measurement window. The length of the measurement window is preferably at least as long as the period duration of the highest still uncritical motor rotational speed of the electric motor.

From the measured motor phase currents $I_U$, $I_V$, $I_W$ at the short-circuited motor terminals U, V, W, a magnitude and/or a frequency of the motor phase currents are/is then determined. What can be used as the magnitude of the motor phase currents $I_U$, $I_V$, $I_W$ is the root-mean-square values thereof or the average values thereof, by way of example. The frequency of the motor phase currents $I_U$, $I_V$, $I_W$ can be determined for example in one motor phase, in two motor phases or in all the motor phases. As a further alternative it is also possible to determine the rotational speed of the motor from the temporal separation of at least two current measurement points (i.e. zero crossings) between at least two motor phases. A faster evaluation of the current frequency can be achieved by the evaluation of a plurality of phases.

Since the motor phase currents $I_U$, $I_V$, $I_W$ at the short-circuited motor terminals U, V, W are a measure of the currents induced in the leads by the electric motor in the generator operating mode and thus a measure of the still existing rotational speed of the electric motor, if the magnitude and/or the frequency of the motor phase currents at the short-circuited motor terminals U, V, W fall(s) below a predefined limit value, then it can be deduced from this that the rotational speed of the electric motor lies below a critical rotational speed, this being referred to as "standstill".

In the case where such a standstill of the electric motor is identified, the control device S can generate an enable signal, for example. Given the presence of said enable signal, an authorization to access an appliance driven by the electric motor (e.g. a laundry drum of a washing machine) can then be enabled, for example, since access by the user is not dangerous.

Since electronically commutated motors cannot rotate more rapidly than is predefined by the electrical rotating field frequency, it is sufficient at least in many cases to carry out the above-described identification of the standstill only after the reversion of the electric motor from a supercritical rotational speed or after a power on reset of the control device S. The access enable is then maintained as long as no electrical rotating field frequencies with supercritical rotational speeds are generated. In the case of washing machines, the critical rotational speed is 60 drum revolutions per minute, for example. Since the washing rotational speeds usually lie in the range of up to 50 rpm and thus below the critical rotational speed, the access authorization can continue to be maintained without further standstill identification processes provided that the electric motor does not approach supercritical rotational speeds. The access authorization then has to be checked for example only upon a reversion from a spin speed and after the power on reset of the controller according to the method proposed here.

In order to further increase the security in the identification of the standstill, it is advantageous if the functionality of the current measurement itself is additionally checked during the standstill identification process. This can be affected for example by checking, after the short-circuiting of the motor terminals U, V, W whether the sum of the motor phase currents is substantially equal to zero at every point in time during the measurement window. If this is not the case, then it must be assumed that at least one of the current measuring devices $M_U$, $M_V$, $M_W$ of the half-bridge is defective. The generation of the enable signal can be prevented in such a case.

In order to increase the accuracy of the method, it is furthermore advantageous to adjust the current measuring device $M_U$, $M_V$, $M_W$. In order to be able to detect even very small motor phase currents $I_U$, $I_V$, $I_W$, the current measuring devices are preferably adjusted at zero current (so-called DC offset adjustment). This can be effected for example while the corresponding motor phase current flows to the positive pole +HV of the voltage intermediate circuit, that is to say the switch $T_{Ut}$, $T_{Vt}$, $T_{Wt}$ or the corresponding freewheeling diode $D_{Ut}$, $D_{Vt}$, $D_{Wt}$ in the upper half-bridge of the voltage intermediate circuit conducts the current.

It goes without saying that the present invention is not just restricted to the embodiment described here. The person skilled in the art will have no problems in identifying various alterations and modifications that lie within the scope of protection defined by the appended claims.

While all the motor terminals of the electric motor were short-circuited in method step a) in the above exemplary embodiment, it is likewise possible to short-circuit only at least two of the motor terminals and to carry out the current measurements for identifying the standstill only at these short-circuited motor terminals.

Furthermore, the above-described arrangement for measuring the motor phase currents with the measuring resistors and the current measuring devices in the lower half-bridge of the voltage intermediate circuit constitutes a particularly simple and cost-effective circuit construction. It goes without saying, however, that other measures for measuring the motor phase currents at the short-circuited motor terminals can also be implemented. In particular, current measurements in the upper half-bridge or in both half-bridges of the voltage intermediate circuit are also possible.

The invention claimed is:

1. A method of operating a 3-phase motor having at least two motor terminals being driven by a control device, which comprises the steps of:
   short-circuiting at least two of the motor terminals of the 3-phase motor via the control device;
   measuring motor phase currents at the motor terminals being short-circuited; and
   identifying a standstill of the 3-phase motor if at least one of a magnitude and a frequency of the motor phase currents measured lies below a predefined limit value.

2. The method according to claim 1, which further comprises short-circuiting all of the motor terminals of the 3-phase motor via the control device.

3. The method according to claim 1, which further comprises using one of a root-mean-square value of the magnitude and an average value of the magnitude within a measurement window as the magnitude.

4. The method according to claim 1, which further comprises carrying out the measuring of the motor phase currents during a measurement window that is at least as long as a period duration of a highest still uncritical rotational speed of the 3-phase motor.

5. The method according to claim 1, which further comprises effecting an identification of the standstill of the 3-phase motor only if a sum of all the motor phase currents measured is substantially equal to zero.

6. The method according to claim 1, which further comprises:
   providing the control device with a frequency converter having a voltage intermediate circuit; and
   measuring the motor phase currents in a bridge branch of the voltage intermediate circuit.

7. The method according to claim 6, which further comprises clamping the motor terminals to a pole of the voltage intermediate circuit during a measurement of the motor phase currents.

8. The method according to claim 7, wherein the motor terminals, during a measurement of the motor phase currents, are clamped to the pole of the voltage intermediate circuit which is connected to the bridge branch of the voltage intermediate circuit in which the motor phase currents are measured.

9. The method according to claim 7, wherein the motor terminals, for adjusting current measuring devices for measuring the motor phase currents, are clamped to the pole of the voltage intermediate circuit which is connected to the bridge branch of the voltage intermediate circuit in which the motor phase currents are not measured.

10. The method according to claim 1, which further comprises determining the frequency of the motor phase currents in one of at least one of the motor phases and from a temporal separation of at least two current measurement points between at least two of the motor phases.

11. The method according to claim 1, which further comprises:
    generating an enable signal if the standstill of the 3-phase motor has been identified; and
    resetting the enable signal in an event of at least one of a reset of the 3-phase motor, a reset of the control device of the 3-phase motor and if the 3-phase motor is rotated again after the standstill.

12. The method according to claim 11, which further comprises resetting the enable signal only when the 3-phase motor is rotated again after the standstill with a rotational speed above a predefined limit value.

13. An apparatus for operating a 3-phase motor with at least two motor terminals, the apparatus comprising:
    a control device for driving the 3-phase motor, said control device having current measuring devices;
    said control device being configured to:
       short-circuit at least two of the motor terminals of the 3-phase motor;
       with at least one of the current measuring devices, measure motor phase currents at the motor terminals being short-circuited; and
       use the measured motor phase currents from the at least one of the current measuring devices to identify a standstill of the 3-phase motor if at least one of a magnitude and a frequency of the motor phase currents measured lies below a predefined limit value.

* * * * *